US012752868B1

(12) United States Patent
Shethia et al.

(10) Patent No.: US 12,752,868 B1
(45) Date of Patent: Oct. 6, 2026

(54) SYSTEM AND METHOD FOR FIFTH WHEEL HEIGHT DETECTION

(71) Applicant: ZF CV Systems Global GmbH, Bern (CH)

(72) Inventors: Shreyansh Shethia, West Lafayette, IN (US); Alec Vucsko, West Lafayette, IN (US); Andreas Schmid, Westpoint, IN (US)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 0 days.

(21) Appl. No.: 19/209,838

(22) Filed: May 16, 2025

(51) Int. Cl.
*B62D 53/08* (2006.01)
*G01C 5/00* (2006.01)
*G01C 9/00* (2006.01)

(52) U.S. Cl.
CPC .......... *B62D 53/0814* (2013.01); *G01C 5/00* (2013.01); *G01C 9/00* (2013.01)

(58) Field of Classification Search
CPC ................ B62D 53/08; B62D 53/0807; B62D 53/0814; G01C 5/00; G01C 9/00
See application file for complete search history.

(56) References Cited

U.S. PATENT DOCUMENTS

2017/0174019 A1* 6/2017 Lurie .................... B60D 1/248
2022/0227435 A1* 7/2022 Moore ............... B62D 53/0821
2023/0093419 A1 3/2023 Welk et al.

FOREIGN PATENT DOCUMENTS

WO WO 2021118502 A1 6/2021

* cited by examiner

*Primary Examiner* — Aaron L Troost
(74) *Attorney, Agent, or Firm* — LEYDIG, VOIT & MAYER, LTD.

(57) ABSTRACT

A system for displaying a height of a fifth wheel of a commercial vehicle includes a controller configured to receive a command to modify a height of the fifth wheel. Based on the received command, the controller rotates a boom arm coupled to the fifth wheel at a first end and a chassis at the second end. The rotation of the boom arm rotates a gear of a gear assembly, where the gear assembly is coupled to the chassis and a second end of the boom arm. The controller receives, from the motor encoder upon rotation of the gear, a rotational position of the gear. Using the rotational position, the controller determines a positioning angle of the boom arm. Based on the positioning angle, the controller determines a height of the fifth wheel, and displays the determined height of the fifth wheel of the commercial vehicle on a display screen.

20 Claims, 7 Drawing Sheets

SYSTEM AND METHOD FOR FIFTH WHEEL HEIGHT DETECTION

The present disclosure relates to a commercial vehicle, and in particular a fifth wheel of the commercial vehicle.

BACKGROUND

Commercial vehicles are conventionally operated with a trailer. A fifth wheel of a commercial vehicle is a coupling device, that is mounted on a chassis of the commercial vehicle, and is designed to securely couple the commercial vehicle with a trailer. In order to mechanically couple the commercial vehicle with the trailer, it is important to properly align the fifth wheel of the commercial vehicle with a kingpin of the trailer.

However, aligning the fifth wheel of the commercial vehicle with the kingpin of the trailer is complicated by the lack of a reliable way to determine a height of the fifth wheel. Conventional commercial vehicles do not provide a direct indication of the height of the fifth wheel, forcing drivers to rely on manually estimated measurements or assumptions, which are time-consuming and prone to error. This process is further complicated by variations in the design of the commercial vehicles, fifth wheel equipment, and kingpin equipment, making it even more difficult to consistently achieve proper alignment.

SUMMARY

Embodiments of the present disclosure provide, in a first aspect, a system for displaying a height of a fifth wheel of a commercial vehicle, the system comprising: a display screen; a boom arm having a first end mechanically coupled to the fifth wheel and a second end pivotably mounted to a chassis of the commercial vehicle at a hinge point; a gear assembly coupled to the chassis and the second end of the boom arm, wherein a change in a positioning angle of the boom arm causes a rotation of gears in the gear assembly; a motor encoder coupled to a measuring gear of the gear assembly that measures a change in a rotational position of the measuring gear; and a controller configured to: receive, from a driver of the commercial vehicle, a command to modify a height of the fifth wheel of the commercial vehicle; rotate the boom arm based on the received command, wherein the rotation of the boom arm causes rotation of the measuring gear of the gear assembly; receive, from the motor encoder upon rotation of the measuring gear, the rotational position of the measuring gear; determine, using the rotational position, an updated positioning angle of the boom arm; determine a height of the fifth wheel based on the updated positioning angle; and display the determined height of the fifth wheel of the commercial vehicle on the display screen.

According to an implementation of the first aspect, the gear assembly further comprises a rotational gear that is fixedly coupled to the boom arm, wherein the rotational gear is configured to rotate about the hinge point, and wherein the rotation of the boom arm around the hinge point causes rotation of the rotational gear around the hinge point.

According to an implementation of the first aspect, the rotational gear is rotatably coupled to the measuring gear, and wherein rotation of the rotational gear causes the rotation of the measuring gear.

According to an implementation of the first aspect, the controller configured to determine the updated positioning angle is further configured to: determine an updated position of the rotational gear based on the rotational position of the measuring gear, wherein the determining is performed based on a size difference between the rotational gear and the measuring gear; and determine the updated positioning angle based on the updated position of the rotational gear.

According to an implementation of the first aspect, the controller configured to determine the updated positioning angle is further configured to: determine a pre-existing positioning angle associated with the boom arm; determine a change in the positioning angle of the boom arm based on the updated position of the rotational gear; and modify the pre-existing angle of the boom arm using the change in the positioning angle to determine the updated positioning angle of the boom arm.

According to an implementation of the first aspect, the rotational gear is a 96-tooth gear and the measuring gear is a 15-tooth gear.

According to an implementation of the first aspect, the controller configured to determine the height of the fifth wheel based on the updated positioning angle is further configured to: determine a height factor based on the updated positioning angle; and calculate the height of the fifth wheel by multiplying a length of a portion of the boom arm with the height factor.

According to an implementation of the first aspect, the system further comprising: an input interface configured to receive the command to modify the height of the fifth wheel of the commercial vehicle.

According to an implementation of the first aspect, the controller configured to rotate the boom arm based on the received command is further configured to: determine whether the received command is to increase the height of the fifth wheel; and based on determining that the received command is to increase the height of the fifth wheel, rotate the boom arm in an anti-clockwise direction.

According to an implementation of the first aspect, the controller configured to rotate the boom arm based on the received command is further configured to: determine whether the received command is to decrease the height of the fifth wheel; and based on determining that the received command is to decrease the height of the fifth wheel, rotate the boom arm in a clockwise direction.

Embodiments of the present disclosure provide, in a second aspect, a method for displaying a height of a fifth wheel of a commercial vehicle, the method comprising: receiving, from a driver of the commercial vehicle, a command to modify a height of the fifth wheel of the commercial vehicle; rotating a boom arm based on the received command, wherein the rotation of the boom arm causes rotation of a measuring gear of the gear assembly, and wherein the boom arm has a first end mechanically coupled to the fifth wheel and a second end pivotably mounted to a chassis of the commercial vehicle at a hinge point; receiving, from a motor encoder coupled to the measuring gear, upon rotation of the measuring gear, the rotational position of the measuring gear; determining, using the rotational position, an updated positioning angle of the boom arm; determining a height of the fifth wheel based on the updated positioning angle; and displaying the determined height of the fifth wheel of the commercial vehicle on a display screen.

According to an implementation of the second aspect, the gear assembly further comprises a rotational gear that is fixedly coupled to the boom arm, wherein the rotational gear is configured to rotate about the hinge point, and wherein the rotation of the boom arm around the hinge point causes rotation of the rotational gear around the hinge point.

According to an implementation of the second aspect, the rotational gear is rotatably coupled to the measuring gear, and wherein rotation of the rotational gear causes the rotation of the measuring gear.

According to an implementation of the second aspect, determining the updated positioning angle further comprises: determining an updated position of the rotational gear based on the rotational position of the measuring gear, wherein the determining is performed based on a size difference between the rotational gear and the measuring gear; and determining the updated positioning angle based on the updated position of the rotational gear.

According to an implementation of the second aspect, determining the updated positioning angle further comprises: determining a pre-existing positioning angle associated with the boom arm; determining a change in the positioning angle of the boom arm based on the updated position of the rotational gear; and modifying the pre-existing angle of the boom arm using the change in the positioning angle to determine the updated positioning angle of the boom arm.

According to an implementation of the second aspect, the rotational gear is a 96-tooth gear and the measuring gear is a 15-tooth gear.

According to an implementation of the second aspect, determining the height of the fifth wheel based on the updated positioning angle further comprises: determining a height factor based on the updated positioning angle; and calculating the height of the fifth wheel by multiplying a length of a portion of the boom arm with the height factor.

According to an implementation of the second aspect, the method further comprises an input interface configured to receive the command to modify the height of the fifth wheel of the commercial vehicle.

According to an implementation of the second aspect, rotating the boom arm based on the received command further comprises: determining whether the received command is to increase the height of the fifth wheel; and based on determining that the received command is to increase the height of the fifth wheel, rotating the boom arm in an anti-clockwise direction.

According to an implementation of the second aspect, rotating the boom arm based on the received command further comprises: determining whether the received command is to decrease the height of the fifth wheel; and based on determining that the received command is to decrease the height of the fifth wheel, rotating the boom arm in a clockwise direction.

BRIEF DESCRIPTION OF THE DRAWINGS

Embodiments of the present disclosure will be described in even greater detail below based on the exemplary figures. The present disclosure is not limited to the exemplary embodiments. All features described and/or illustrated herein can be used alone or combined in different combinations in embodiments of the present disclosure. The features and advantages of various embodiments of the present disclosure will become apparent by reading the following detailed description with reference to the attached drawings which illustrate the following.

DETAILED DESCRIPTION

Figure 1:
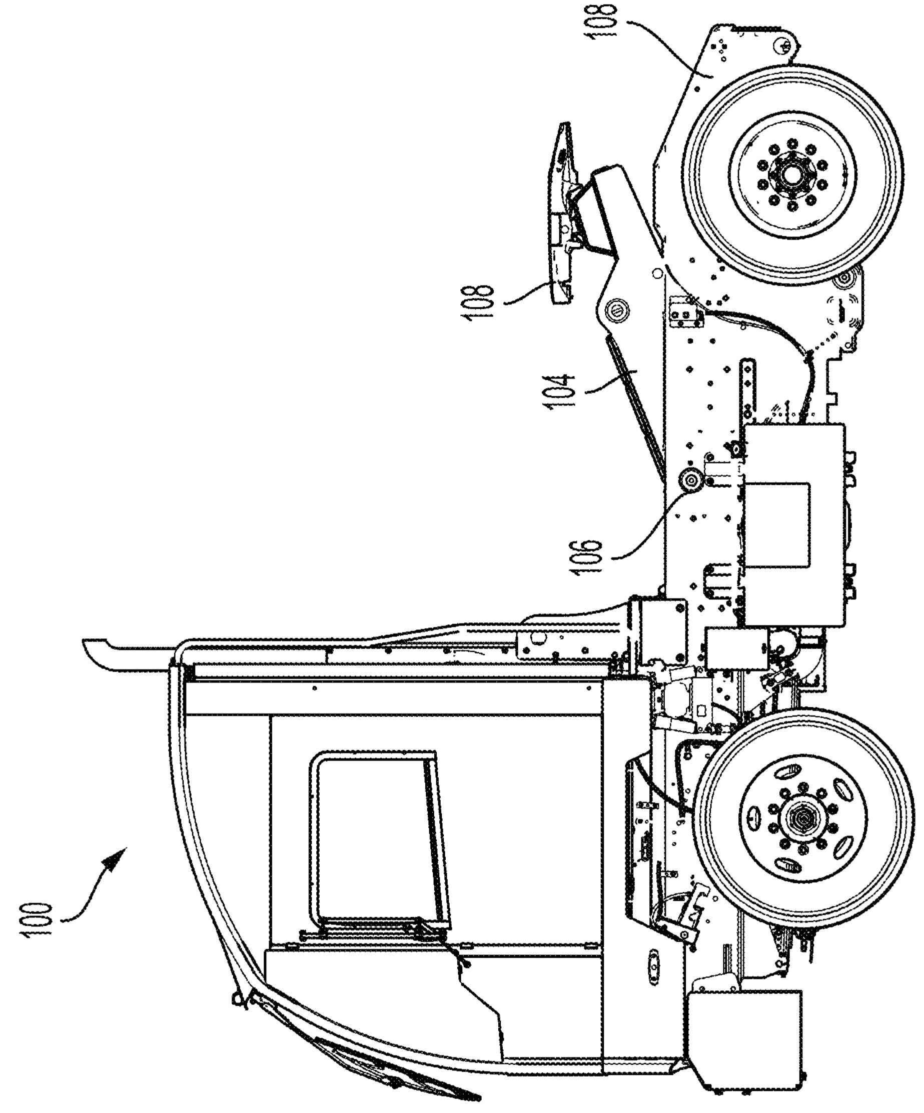
FIG. 1 illustrates a side view of a commercial vehicle with a fifth wheel, according to one or more examples of the present disclosure.

Examples of the presented application will now be described more fully hereinafter with reference to the accompanying FIGs., in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

Commercial vehicles comprise a fifth wheel assembly that is used to mechanically couple the commercial vehicles to large trailers for hauling heavy loads over large distances. In some embodiments, the fifth wheel is a horseshoe-shaped coupling device, which is mounted on a chassis of the commercial vehicle and is designed to securely mechanically couple with a kingpin of a trailer. In order to successfully couple the fifth wheel of the commercial vehicle with the kingpin of the trailer, it is important to properly align the fifth wheel of the commercial vehicle with the kingpin of the trailer.

However, aligning the fifth wheel of the commercial vehicle with the kingpin of the trailer is made complicated by the lack of a reliable way to determine the height of the fifth wheel. This lack of precise height information can lead to misalignment, resulting in failed coupling attempts, equipment damage, and increased safety risks. Conventional methods for adjusting the fifth wheel of a commercial vehicle involve a driver of the commercial vehicle manually trying to adjust the height of the fifth wheel of the vehicle using their best estimation of the height of the fifth wheel and the kingpin of the trailer. Manually adjusting the fifth wheel without accurate feedback slows down operations and causes excessive wear on vehicle components, leading to higher maintenance costs. The reliance on manually adjusting the height of the fifth wheel highlights the need for an innovative solution that provides real-time fifth wheel height information, enabling safer, more efficient, and more reliable trailer coupling.

Embodiments of the present disclosure provide a system for accurately determining and displaying the height of a fifth wheel of a commercial vehicle. The determined height of the fifth wheel is provided on a display to a driver of the commercial vehicle so that they are able to more easily and accurately adjust the height of the fifth and efficiently align the fifth wheel with the kingpin of the trailer.

FIG. 1 illustrates a side view of a commercial vehicle with a fifth wheel, according to one or more examples of the present disclosure. FIG. 1 depicts a commercial vehicle 100. The commercial vehicle 100 includes a fifth wheel 102, a boom arm 104, and a chassis 108. In some embodiments, the fifth wheel 102 may be a horseshoe-shaped coupling device, which is mounted on the chassis 108 of the commercial vehicle 100 using the boom arm 104. The fifth wheel 102 may be used to securely mechanically couple the commercial vehicle 100 with a kingpin of a trailer.

The boom arm 104 is rotatably coupled to the chassis 108 of the commercial vehicle 100 at a hinge point 106. The movement of the boom arm 104 around the hinge point 106 modifies the height of the fifth wheel 102. The movement of the boom arm 104 around the hinge point 106 may be used to align the fifth wheel 102 with a kingpin of a trailer for mechanical coupling.

In accordance with embodiments of the present disclosure, a gear assembly and a motor encoder may be used to record the movement of the boom arm 104 around the hinge point 106 in order to determine the height of the fifth wheel 102. For example, the gear assembly may comprise at least a first gear and a second gear, which are rotatably coupled to each other. The first gear of the gear assembly may be fixedly coupled to the boom arm 104 and may be configured to rotate with the boom arm. The second gear of the gear assembly may be rotatably coupled to the chassis 108. The rotation of the boom arm 104 around the hinge point 106 may cause rotation of the first gear. The rotation of the first gear may cause rotation of the second gear. The rotation of the second gear of gear assembly is recorded by a motor encoder, which is rotatably coupled to the chassis 108. The rotation of the second gear of the gear assembly as recorded by the motor encoder is used to determine an angle of the boom arm with respect to a horizontal portion of the chassis 108. The angle between the boom arm 104 and the chassis 108 may be used to determine the height of the fifth wheel 102.

In accordance with embodiments of the present disclosure, in order to modify the height of the fifth wheel 102, a driver of the commercial vehicle 100 may provide an instruction to increase or decrease the height of the fifth wheel 102 by interacting with an interactive interface installed in a cab of the commercial vehicle 100. The instruction provided by the driver at the interactive interface may be sent to a controller.

Upon receiving the instructions from the interactive interface, the controller may provide an instruction to the boom arm 104 to move based on the instructions received from the interactive interface. For instance, if the interactive interface receives an instruction to increase the height of the fifth wheel 102, the interactive interface provides the instruction to the controller. The controller may subsequently instruct the boom arm 104 to move about the hinge point 106 in a first direction, causing the fifth wheel to move in an upward direction. The movement of the boom arm 104 in the first direction may cause the rotation of the gears of the gear assembly. The rotation of the gears of the assembly may be captured by the motor encoder mechanically coupled to the gear assembly. Alternatively, if the interactive interface receives an instruction to decrease the height of the fifth wheel, the interactive interface provides this instruction to the controller. The controller may subsequently instruct the boom arm 104 to move about the hinge point 106 in a second direction (e.g., opposite to the first direction), causing the fifth wheel 102 to move in a downward direction. The upward direction of movement of the fifth wheel may be defined as the fifth wheel 102 moving away from the chassis 108, whereas the downward direction of movement of the fifth wheel may be defined as the fifth wheel moving towards the chassis 108. The movement of the fifth wheel 102 in the upward direction increases the height of the fifth wheel 102, and the movement of the fifth wheel 102 in the downward direction decreases the height of the fifth wheel 102.

According to embodiments of the present disclosure, the motor encoder, mechanically coupled to the gear assembly, measures a rotation of the gear assembly and provides the measured rotation to the controller. The operation of the motor encoder is described in more detail with respect to FIG. 4. The controller may utilize the measured rotation information to determine a current positioning angle of the boom arm 104. The current positioning angle of the boom arm 104 may be utilized by the controller to determine the height of the fifth wheel. The controller may provide the determined height of the fifth wheel 102 to a display portion of the interactive interface associated with the commercial vehicle 100 for a driver of the commercial vehicle 100.

Figure 2:
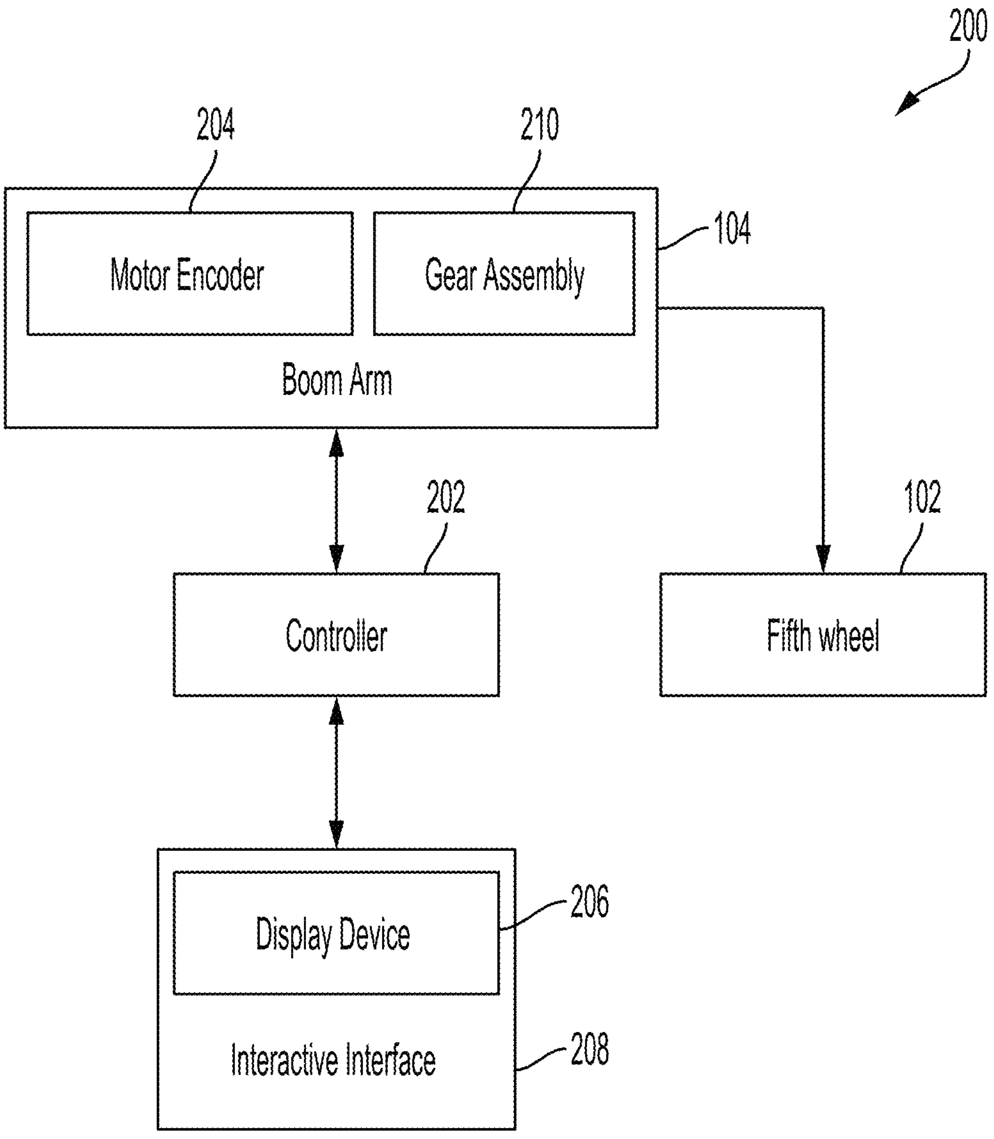
FIG. 2 illustrates an exemplary system to measure and display the height of the fifth wheel of a commercial vehicle, according to one or more embodiments of the present disclosure.

FIG. 2 illustrates an exemplary system to measure and display the height of the fifth wheel of a commercial vehicle, according to one or more embodiments of the present disclosure. System 200 of FIG. 2 includes a controller 202, a boom arm 104, a fifth wheel 102, and an interactive interface 208.

The interactive interface 208 may be part of a driver cab of the commercial vehicle 100 (shown in FIG. 1). A driver of the commercial vehicle 100 may interact with the interactive interface 208 to provide instructions to increase or decrease the height of the fifth wheel 102. In some embodiments, the interactive interface 208 may include an input interface that is used to receive an input from a user associated with the height of the fifth wheel 102. For example, the input interface of the interactive interface 208 may allow a user to provide an instruction to increase or decrease in the height of the fifth wheel 102.

For example, as discussed with respect to FIG. 1, the driver of the commercial vehicle 100 may interact with the interactive interface 208 and provide instructions to the interactive interface 208 to increase the height of the fifth wheel 102. The instruction provided by the driver at the interactive interface 208 may be sent to the controller 202. Upon receiving the instructions from the interactive interface 208, the controller 202 provides an instruction to the boom arm 104 to move about the hinge point 106 in a first direction so as to cause the fifth wheel 102 to move in an upward direction. The movement of the boom arm 104 in the first direction may cause the rotation of the gears of the gear assembly. The rotation of the gears of the assembly may be captured by the motor encoder mechanically coupled to the gear assembly. Alternatively, if the interactive interface receives an instruction to decrease the height of the fifth wheel, the interactive interface 208 provides this instruction to the controller 202. The controller may subsequently instruct the boom arm 104 to rotate about the hinge point 106 in a second direction (e.g., opposite to the first direction), causing the fifth wheel 102 to move in a downward direction.

A motor encoder 204 is mechanically coupled to the gear assembly 210 to measure the rotation of at least some of the gears of the gear assembly. The measurement of the rotation of the gears of the gear assembly 210 is provided by the motor encoder 204 to the controller 202. The operation of the motor encoder is described in more detail with respect to FIG. 4. The controller 202 may utilize the measured rotations to determine the positioning angle of the boom arm 104. In some embodiments, the controller 202 may utilize the measured rotations to determine a change in the positioning angle of the boom arm 104. The controller 202 may combine the change in the positioning angle of the boom arm 104 with a previously recorded positioning angle of the boom arm 104 recorded at the controller 202, to determine the current positioning angle of the boom arm 104. The current positioning angle of the boom arm 104 may be used to determine a height of the fifth wheel 102 coupled to the boom arm 104.

The determined height of the fifth wheel 102 may be provided by the controller 202 to the interactive interface 208. The interactive interface 208 may include a display device 206 on which the height of the fifth wheel 102, as provided by the controller 202 is displayed.

Figure 3:
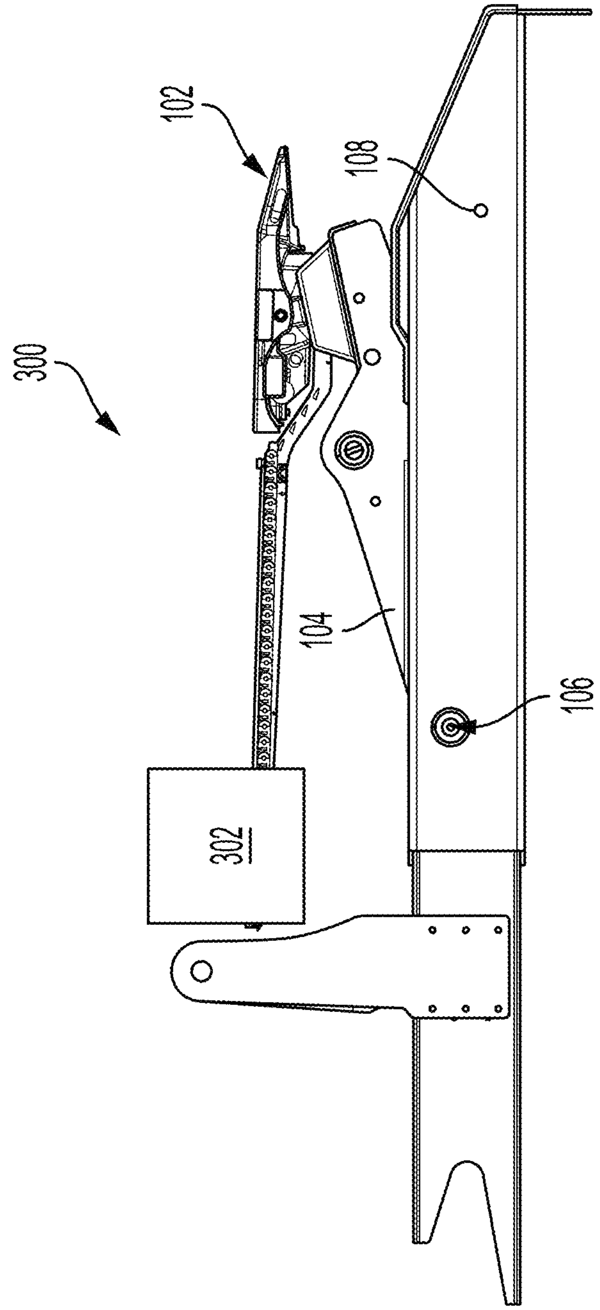
FIG. 3 illustrates a side view of the fifth wheel of the commercial wheel, according to one or more examples of the present disclosure.

FIG. 3 illustrates a side-view of the fifth wheel of the commercial wheel, according to one or more examples of the present disclosure. Side view 300 as shown in FIG. 3 depicts a portion of the commercial vehicle 100 that includes the chassis 108, the boom arm 104, and the fifth wheel 102. The boom arm 104 may be rotatably coupled to the chassis 108 at the hinge point 106. The movement of the boom arm 104 causes the fifth wheel 102, mechanically coupled to the boom arm 104, to move in a corresponding direction, which adjusts the height of the fifth wheel 102.

The rotation of the boom arm 104 around the hinge point 106 may cause gears in the gear assembly 210 (shown in FIG. 2), that may be mechanically coupled to the boom arm 104, to rotate. A motor encoder 204, that may be mechanically coupled to the gear assembly 210, may be used to measure the rotations of the gears of the gear assembly, and provide the measured rotations to the controller 202 (shown in FIG. 2). The controller 202 may use the measured rotations to determine the positioning angle of the boom arm 104. The positioning angle of the boom arm 104 may be subsequently used to determine the height of the fifth wheel 102.

The height of the fifth wheel 102 as determined by the controller 202 may be displayed on a display device 206 (shown in FIG. 2) of an interactive interface 208 (shown in FIG. 2) that is part of the commercial vehicle 100. The height of the fifth wheel 102, as displayed on the display device 206 of the interactive interface 208, may be used to mechanically couple the commercial vehicle 100 to a trailer.

In accordance with some embodiments, the commercial vehicle 100 may include an auto-coupling device 302. The auto-coupling device 302 may be used to automate the mechanical coupling process of the fifth wheel 102 of the commercial vehicle 100, with a kingpin of a trailer. For example, the auto-coupling device 302 may determine a target height of the fifth wheel 102, at which the fifth wheel 102 may be mechanically coupled with the kingpin of the trailer. The auto-coupling device 302 may include a plurality of sensors that may be used to determine the target height of the fifth wheel 102. The auto-coupling device 302 may provide the target height of the fifth wheel 102 to the controller 202 (shown in FIG. 2). The controller 202 may record the current height of the boom arm 104. Based on the current height of the boom arm 104 and the target height of the boom arm, the controller 202 may provide instructions to the boom arm 104, to cause an adjustment of the position of the boom arm 104. Once the position of the boom arm 104 is adjusted, the height of the fifth wheel 102 may reach the target height. As the fifth wheel 102 reaches the target height, the controller 202 may provide a notification to the auto-coupling device 302. Based on the fifth wheel 102 reaching the target height, the auto-coupling device 302 may perform the coupling of the fifth wheel 102 with a kingpin of the trailer.

Figure 4:
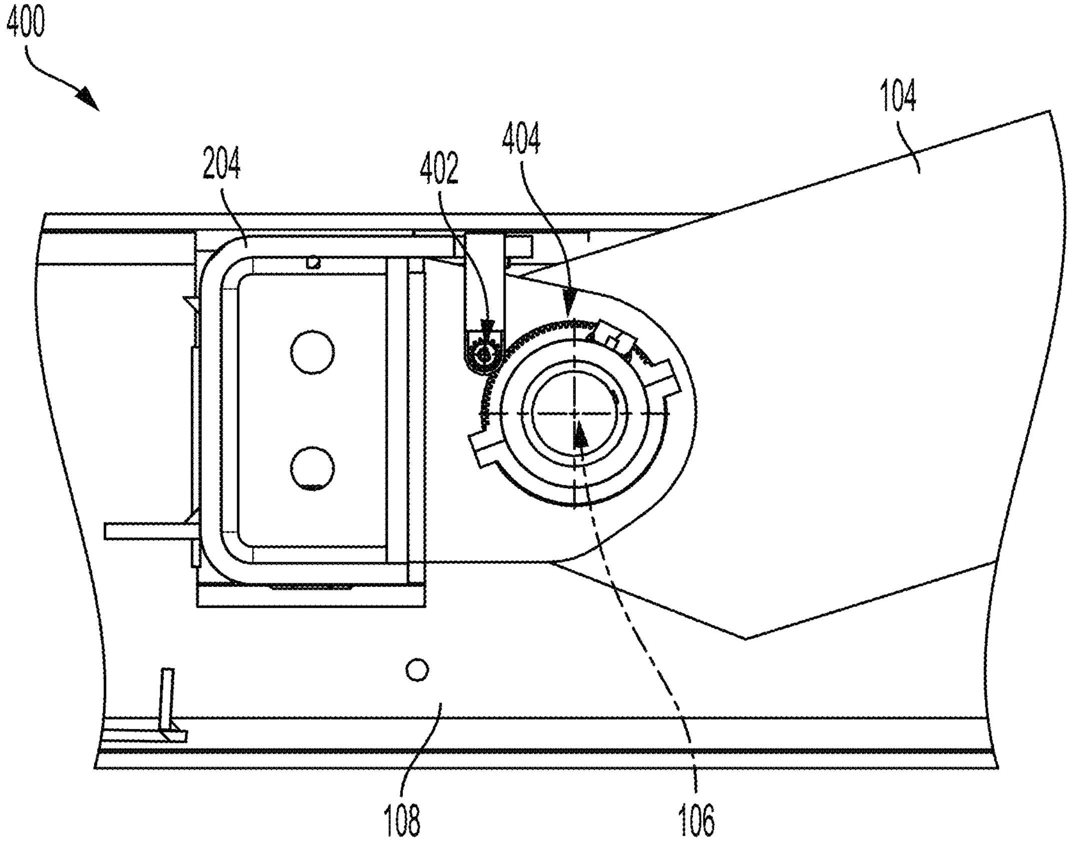
FIG. 4 illustrates a portion of the chassis of the commercial vehicle, according to one or more examples of the present disclosure.

FIG. 4 illustrates a cross-sectional view of a portion of the chassis of the commercial vehicle, according to one or more examples of the present disclosure. Cross-sectional view 400 depicts a portion of the chassis 108 that includes the hinge point 106 and a portion of the boom arm 104. As previously discussed, the boom arm 104 is mechanically coupled to the chassis 108 at the hinge point 106. In accordance with embodiments of the present disclosure, the controller 202 may instruct the boom arm 104 to rotate about the hinge point 106 in order to increase or decrease the height of the fifth wheel (shown in FIG. 3). A gear assembly 210 (as shown in FIG. 2) may be used to measure the rotation of the boom arm 104 about the hinge point 106. The gear assembly 210 may include a rotational gear 404 and a measuring gear 402. The rotating gear 404 is fixedly coupled to the boom arm 104 and is configured to rotate with the boom arm 104 around the hinge point 106. The measuring gear 402 may be rotatably coupled to the rotational gear 404 and the motor encoder 204.

Based on instructions received from a driver of the commercial vehicle 100, the controller 202 (shown in FIG. 2) may provide instructions to cause the movement of the boom arm 104 in a corresponding direction. For example, if the driver of the commercial vehicle 100 provides instructions to increase the height of the fifth wheel 102, the controller 102 may instruct the boom arm 104 to rotate in an anti-clockwise direction about the hinge point 106. The movement of the boom arm 104 in the anti-clockwise direction around the hinge point 106 may cause rotation of the rotational gear 404 in the anti-clockwise direction around the hinge point 106. Alternatively, if the driver of the commercial vehicle 100 provides instructions to decrease the height of the fifth wheel 102, the controller 102 may instruct the boom arm 104 to rotate in a clockwise direction around the hinge point 106. The movement of the boom arm 104 in the clockwise direction around the hinge point 106 may cause rotation of the rotational gear 404 in the clockwise direction around the hinge point 106. The rotation of the boom arm 104 around the hinge point 106 may cause a corresponding change in the height of the fifth wheel (shown in FIG. 3).

The rotation of the rotational gear 404 around the hinge point 106 may cause a corresponding rotation of the measuring gear 402. The measuring gear 402 may be mechanically coupled to the rotational gear 404 based on an interaction of a first set of gear teeth on the rotational gear 404 and a second set of gear teeth on the measuring gear 402. For example, the rotational gear 404 may be a 96-tooth gear, and the measuring gear 402 may be a 15-tooth gear. A 96-tooth rotational gear 404 is a gear that has 96 gear teeth distributed around the circumference of the rotational gear 404. Similarly, the 15-tooth measuring gear 402 has 15 gear teeth distributed around the circumference of the measuring gear 402. The rotation of the rotational gear 404, based on the rotation of the boom arm 104 around the hinge point 106, may cause a corresponding rotation of the measuring gear 402. In some embodiments of the present disclosure, due to the difference in size between the rotational gear 404 and the measuring gear 402, a partial rotation of the rotational gear 404 may cause multiple rotations of the measuring gear 402.

A motor encoder 204 may be fixedly coupled to the chassis 108 and mechanically coupled to the measuring gear 402. The motor encoder 204 may be configured to measure rotations of the measuring gear 402. The motor encoder 204 may provide the measured rotations of the measuring gear 402 to the controller 202 (shown in FIG. 2). The controller 202 may utilize the measured rotations of the measuring gear 402 to determine a corresponding partial rotation of the rotational gear 404. The controller 202 may use the partial rotation of the rotational gear 404 to determine a positional angle of the boom arm with respect to the horizontal portion of the chassis 108. The angular position of the boom arm 104 may be used to determine a height of the fifth wheel 102. In some embodiments, the controller 102 may comprise a predetermined algorithm that may be used to convert the rotations of the measuring gear 402, as received from the motor encoder 204 into an angle between the boom arm 104 and the horizontal portion of the chassis 108. For example, the predetermined algorithm may utilize a ratio between a radius of the measuring gear 402 and a radius of the rotational gear 404 to determine the amount of rotation of rotation of the rotational gear 404 based on the measured rotations of the measuring gear 402. The amount of rotation of the rotational gear 404 may be used to determine a change in the positional angle of the boom arm 104. The change in positional angle of the boom arm 104 may be combined with the previously recorded positional angle of the boom arm 104 to determine a current positional angle of the boom arm 104. The current positional angle of the boom arm 104 may be used to determine the current height of the fifth wheel 102. This is described in more detail with respect to FIG. 5.

Figure 5:
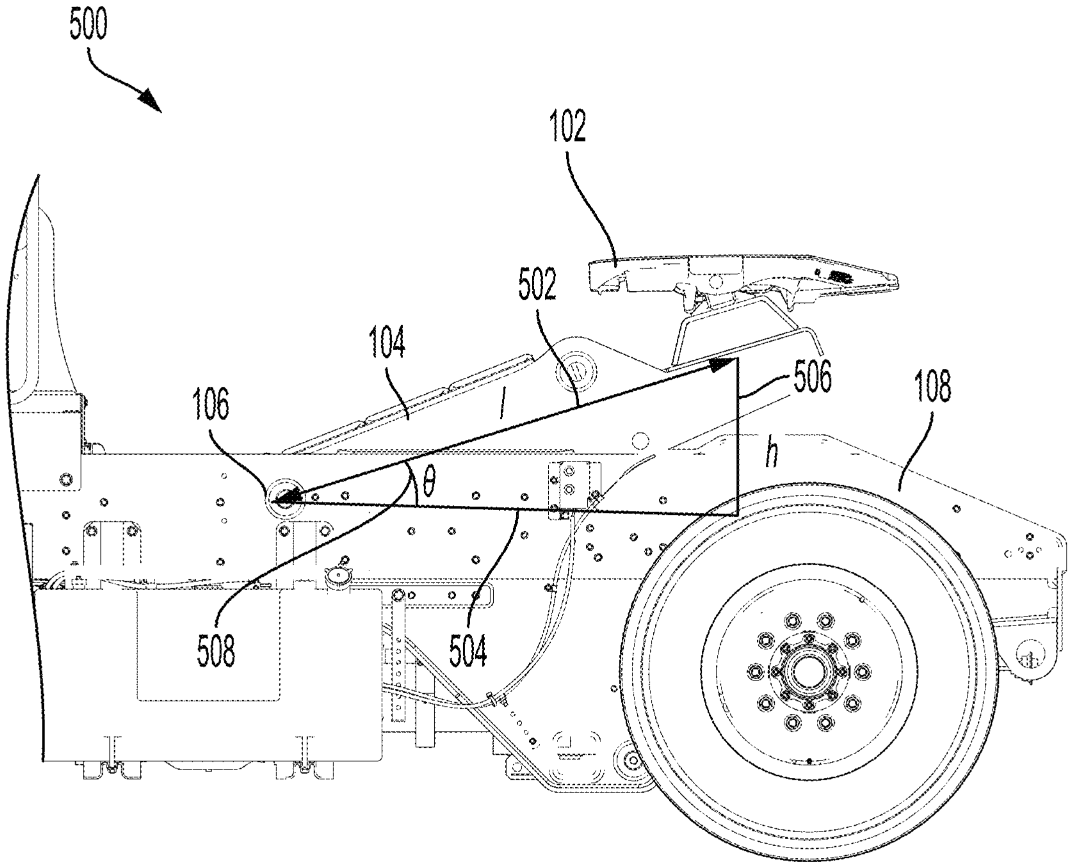
FIG. 5 illustrates a perspective view of hinge of the fifth wheel, according to one or more examples of the present disclosure.

FIG. 5 illustrates another side view of the fifth wheel of the commercial wheel, according to one or more examples of the present disclosure. The side view 500 of FIG. 5 depicts a portion of the commercial vehicle 100 as shown in FIG. 1. Side view 500 depicts a portion of the chassis 108 of the commercial vehicle 100. The portion of the chassis 108 shown in FIG. 5 depicts a boom arm 104 that is rotatably coupled to the chassis 108 at a hinge point 106. As previously discussed, the controller 202 (shown in FIG. 2) may provide instructions to the boom arm 104 to rotate about the hinge point 106. The rotation of the boom arm 104 about the hinge point 106 may cause the rotational gear 404 (shown in FIG. 4) to rotate about the hinge point 106. The rotation of the rotational gear 404, based on the rotation of the boom arm 104 around the hinge point 106, may cause a corresponding rotation of the measuring gear 402 (shown in FIG. 4). The motor encoder 204 (shown in FIG. 2) may be configured to measure rotations of the measuring gear 402. The motor encoder 204 may provide the measured rotations of the measuring gear 402 to the controller 202 (shown in FIG. 2). The controller 202 may utilize the measured rotations of the measuring gear 402 to determine a corresponding partial rotation of the rotational gear 404. The controller 202 may use the partial rotation of the rotational gear 404 to determine a positional angle (θ) 508 of the rotational portion 502 of the boom arm 104 with respect to the horizontal portion 504 of the chassis 108.

The length (l) of the rotational portion 502 of the boom arm 104 may be provided to the controller 202. Based on the length (l) of the rotational portion 502 of the boom arm 104, and the positional angle (θ) 508 formed between the rotational portion 502 of the boom arm 104 and the horizontal portion 504 of the chassis 108, the controller 202 may determine a height (h) 506 of the fifth wheel 102 of the commercial vehicle 100 that is mechanically coupled to the boom arm 104. In some embodiments, the controller 202 may determine the height (h) 506 of the fifth wheel based on a trigonometric function. For example, the height (h) 506 may be determined by the controller 202 using the following formula:

$$h = l\sin\theta$$

where h is a height of the fifth wheel 102, l is a length of the rotational portion 502 of the boom arm 104, and θ is an angle between the horizontal portion 504 of the chassis 108 and the rotational portion 502 of the boom arm 104. The height determined by the controller 202 may be provided to a display device 206 of the interactive interface 208.

Figure 6:
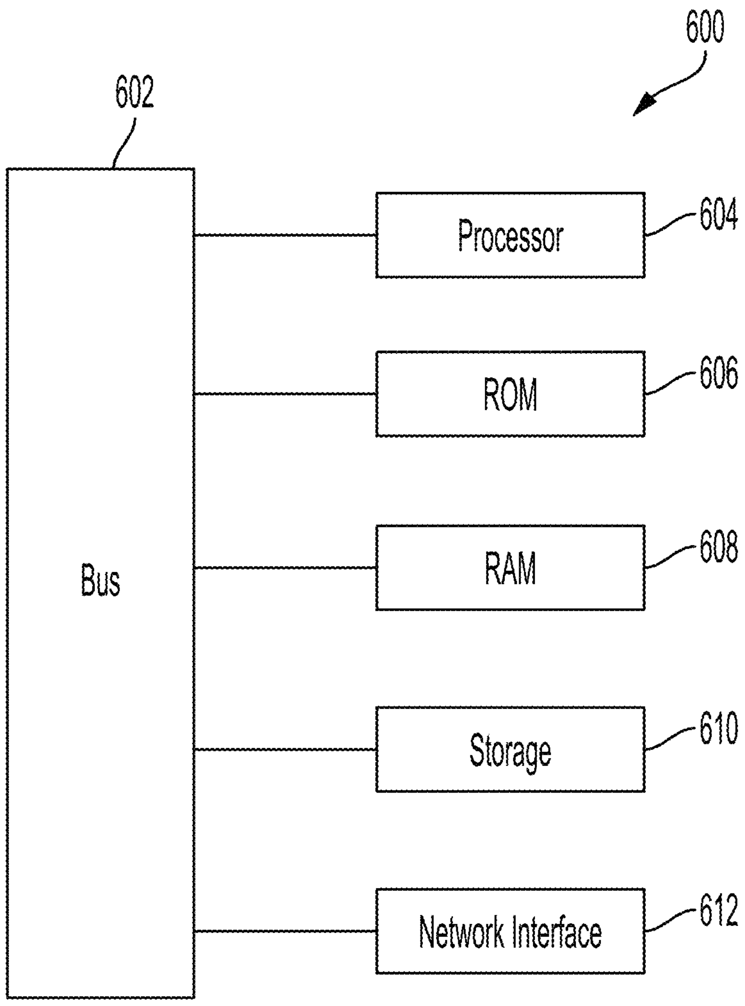
FIG. 6 illustrates another side view of the fifth wheel of the commercial wheel, according to one or more examples of the present disclosure.

FIG. 6 is a block diagram of an exemplary system or device 600 within the environment 200 such as the controller 202. The system 600 includes a processor 604, such as a central processing unit (CPU), and/or logic, which executes computer executable instructions for performing the functions, processes, and/or methods described herein. In some examples, the computer executable instructions are locally stored and accessed from a non-transitory computer readable medium, such as storage 610, which may be a hard drive or flash drive. Read Only Memory (ROM) 606 includes computer executable instructions for initializing the processor 604, while the random-access memory (RAM) 608 is the main memory for loading and processing instructions executed by the processor 604. The network interface 612 may connect to a wired network or cellular network and to a local area network or wide area network. The system 600 may also include a bus 602 that connects the processor 604, ROM 606, RAM 608, storage 610, and/or the network interface 612. The components within the system 600 may use the bus 602 to communicate with each other. The components within the system 600 are merely exemplary and might not be inclusive of every component within the controller 202. Additionally, and/or alternatively, the system 600 may further include components that might not be included within every entity of environment 600. For instance, in some examples, the controller 202 might not include a network interface 612.

Figure 7:
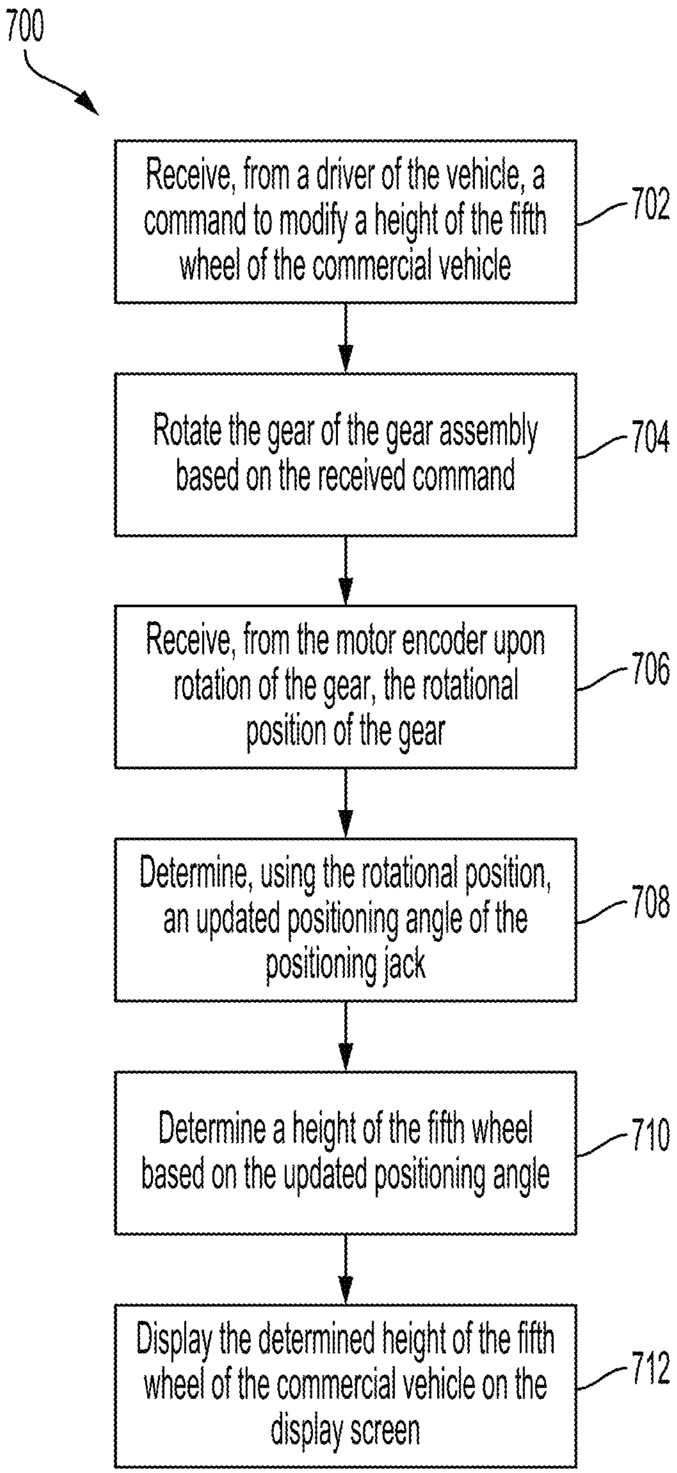
FIG. 7 illustrates a method for determining a height of a fifth wheel of a commercial vehicle, according to one or more examples of the present disclosure.

FIG. 7 illustrates a method for determining a height of a fifth wheel of a commercial vehicle, according to one or more examples of the present disclosure. In some embodiments, the process 700 may be performed by the environment 200 of FIG. 2. However, it will be recognized that any of the following blocks may be performed in any suitable order and that the process 700 may be performed in any environment and by any suitable computing device and/or controller. For instance, the process 800 may also be performed by the controller 202 shown in FIG. 2.

At 702, the controller 202 receives, from a driver of the vehicle, a command to modify a height of the fifth wheel of the commercial vehicle. For example, a user of the commercial vehicle 100 may interact with the interactive interface 208 (shown in FIG. 2) to provide instructions to increase or decrease the height of the fifth wheel 102. The instructions received at the interactive interface 208 is provided to the controller 202 (shown in FIG. 2).

At 704, the controller 202 rotates the boom arm based on the received command, wherein the rotation of the boom arm causes rotation of the gear of the gear assembly. For example, based on the instructions received from the interactive interface 208, the controller 202 may provide instructions to a boom arm 104 to rotate about the hinge point 106 (shown in FIG. 1). The rotation of the boom arm 104 about the hinge point 106 may cause a rotational gear of the gear assembly 210 (shown in FIG. 2) to rotate about the hinge point 106.

At 706, the controller 202 receives, from the motor encoder upon rotation of the gear, the rotational position of the gear. For example, the rotation of the rotational gear 404 around the hinge point 106 may cause a corresponding rotation of the measuring gear 402. A motor encoder 204 may be fixedly coupled to the chassis 108 and mechanically coupled to the measuring gear 402. The motor encoder 204 may be configured to measure rotations of the measuring gear 402. The motor encoder 204 may provide the measured rotations of the measuring gear 402 to the controller 202 (shown in FIG. 2).

At 708, the controller 202 determines, using the rotational position, an updated positioning angle of the boom arm. For example, The controller 202 may utilize the measured rotations of the measuring gear 402 to determine a corresponding partial rotation of the rotational gear 404. The controller 202 may use the partial rotation of the rotational gear 404 to determine a positional angle of the boom arm 104 with respect to the horizontal portion of the chassis 108.

At 710, the controller 202 determines a height of the fifth wheel based on the updated positioning angle. For example, based on the length (l) of the rotational portion 502 of the boom arm 104, and the positional angle (θ) 508 formed between the rotational portion 502 of the boom arm 104 and the horizontal portion 504 of the chassis 108, the controller 202 may determine a height (h) 506 of the fifth wheel 102 of the commercial vehicle 100 that is mechanically coupled to the boom arm 104.

At 712, the controller 202 displays the determined height of the fifth wheel of the commercial vehicle on the display screen. For example, the height determined by the controller 202 may be provided to a display device 206 (shown in FIG. 2) of the interactive interface 208 (shown in FIG. 2).

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A system for displaying a height of a fifth wheel of a commercial vehicle, the system comprising:
- a display screen;
- a boom arm having a first end mechanically coupled to the fifth wheel and a second end pivotably mounted to a chassis of the commercial vehicle at a hinge point;
- a gear assembly coupled to the chassis and the second end of the boom arm, wherein a change in a positioning angle of the boom arm causes a rotation of gears in the gear assembly;
- a motor encoder coupled to a measuring gear of the gear assembly that measures a change in a rotational position of the measuring gear; and
- a controller configured to:
  - receive, from a driver of the commercial vehicle, a command to modify a height of the fifth wheel of the commercial vehicle;
  - rotate the boom arm based on the received command, wherein the rotation of the boom arm causes rotation of the measuring gear of the gear assembly;
  - receive, from the motor encoder upon rotation of the measuring gear, the rotational position of the measuring gear;
  - determine, using the rotational position, an updated positioning angle of the boom arm;
  - determine a height of the fifth wheel based on the updated positioning angle; and
  - display the determined height of the fifth wheel of the commercial vehicle on the display screen.

2. The system of claim 1, wherein the gear assembly further comprises a rotational gear that is fixedly coupled to the boom arm, wherein the rotational gear is configured to rotate about the hinge point, and wherein the rotation of the boom arm around the hinge point causes rotation of the rotational gear around the hinge point.

3. The system of claim 2, wherein the rotational gear is rotatably coupled to the measuring gear, and wherein rotation of the rotational gear causes the rotation of the measuring gear.

4. The system of claim 3, wherein the controller configured to determine the updated positioning angle is further configured to:
- determine an updated position of the rotational gear based on the rotational position of the measuring gear, wherein the determining is performed based on a size difference between the rotational gear and the measuring gear; and
- determine the updated positioning angle based on the updated position of the rotational gear.

5. The system of claim 4, wherein the controller configured to determine the updated positioning angle is further configured to:
- determine a pre-existing positioning angle associated with the boom arm;
- determine a change in the positioning angle of the boom arm based on the updated position of the rotational gear; and
- modify the pre-existing angle of the boom arm using the change in the positioning angle to determine the updated positioning angle of the boom arm.

6. The system of claim 2, wherein the rotational gear is a 96-tooth gear and the measuring gear is a 15-tooth gear.

7. The system of claim 1, wherein the controller configured to determine the height of the fifth wheel based on the updated positioning angle is further configured to:

determine a height factor based on the updated positioning angle; and calculate the height of the fifth wheel by multiplying a length of a portion of the boom arm with the height factor.

8. The system of claim 1, further comprising:

an input interface configured to receive the command to modify the height of the fifth wheel of the commercial vehicle.

9. The system of claim 1, wherein the controller configured to rotate the boom arm based on the received command is further configured to:

determine whether the received command is to increase the height of the fifth wheel; and based on determining that the received command is to increase the height of the fifth wheel, rotate the boom arm in an anti-clockwise direction.

10. The system of claim 1, wherein the controller configured to rotate the boom arm based on the received command is further configured to:

determine whether the received command is to decrease the height of the fifth wheel; and based on determining that the received command is to decrease the height of the fifth wheel, rotate the boom arm in a clockwise direction.

11. A method for displaying a height of a fifth wheel of a commercial vehicle, the method comprising:

receiving, from a driver of the commercial vehicle, a command to modify a height of the fifth wheel of the commercial vehicle;

rotating a boom arm based on the received command, wherein the rotation of the boom arm causes rotation of a measuring gear of the gear assembly, and wherein the boom arm has a first end mechanically coupled to the fifth wheel and a second end pivotably mounted to a chassis of the commercial vehicle at a hinge point;

receiving, from a motor encoder coupled to the measuring gear, upon rotation of the measuring gear, the rotational position of the measuring gear;

determining, using the rotational position, an updated positioning angle of the boom arm;

determining a height of the fifth wheel based on the updated positioning angle; and displaying the determined height of the fifth wheel of the commercial vehicle on a display screen.

12. The method of claim 11, wherein the gear assembly further comprises a rotational gear that is fixedly coupled to the boom arm, wherein the rotational gear is configured to rotate about the hinge point, and wherein the rotation of the boom arm around the hinge point causes rotation of the rotational gear around the hinge point.

13. The method of claim 12, wherein the rotational gear is rotatably coupled to the measuring gear, and wherein rotation of the rotational gear causes the rotation of the measuring gear.

14. The method of claim 13, wherein determining the updated positioning angle further comprises:

determining an updated position of the rotational gear based on the rotational position of the measuring gear, wherein the determining is performed based on a size difference between the rotational gear and the measuring gear; and determining the updated positioning angle based on the updated position of the rotational gear.

15. The method of claim 14, wherein determining the updated positioning angle further comprises:

determining a pre-existing positioning angle associated with the boom arm;

determining a change in the positioning angle of the boom arm based on the updated position of the rotational gear; and modifying the pre-existing angle of the boom arm using the change in the positioning angle to determine the updated positioning angle of the boom arm.

16. The method of claim 12, wherein the rotational gear is a 96-tooth gear and the measuring gear is a 15-tooth gear.

17. The method of claim 11, wherein determining the height of the fifth wheel based on the updated positioning angle further comprises:

determining a height factor based on the updated positioning angle; and calculating the height of the fifth wheel by multiplying a length of a portion of the boom arm with the height factor.

18. The method of claim 11, further comprising:

an input interface configured to receive the command to modify the height of the fifth wheel of the commercial vehicle.

19. The method of claim 11, wherein rotating the boom arm based on the received command further comprises:

determining whether the received command is to increase the height of the fifth wheel; and based on determining that the received command is to increase the height of the fifth wheel, rotating the boom arm in an anti-clockwise direction.

20. The method of claim 11, wherein rotating the boom arm based on the received command further comprises:

determining whether the received command is to decrease the height of the fifth wheel; and based on determining that the received command is to decrease the height of the fifth wheel, rotating the boom arm in a clockwise direction.

* * * * *